Patented Aug. 17, 1943

2,327,153

UNITED STATES PATENT OFFICE 2,327,153

RECOVERY OF MAGNESIUM FROM HALIDE FLUXES

William Clifford Newhams and Charles E. Nelson, Midland, Mich., assignors to The Dow Chemical Company, Midland, Mich., a corporation of Michigan No Drawing. Application July 2, 1942,
Serial No. 449,512

5 Claims. (Cl. 75—24)

This invention relates to a method of recovering magnesium and magnesium-base alloys from dispersions thereof in alkali- and alkaline earth-metal halide fluxes.

As is well known, various metallurgical operations involving magnesium are usually carried out while the metal is at least partly immersed in a bath of protective flux essentially comprising alkali- and alkaline earth-metal halides. During these operations, the flux tends to absorb impurities and any magnesium oxide present in the system, and a portion of the flux, together with most of the impurities and oxide, eventually settles to the bottom of the container as a more or less separate sludge-like layer, termed "spent flux," which is withdrawn from time to time as fresh flux is added. This spent flux or sludge, on removal, almost invariably has entrapped in it a small proportion of the magnesium or magnesium-base alloy being treated, usually in the form of a dispersion of discrete fine globules of metal, which cannot readily be coalesced to a reguline mass, despite the fact that the metal usually has a density slightly lower than that of the flux. Efforts have been made to recover this dispersed metal, as by casting the flux into blocks, crushing, and then screening or leaching with water, but considerable difficulty has been encountered because of the fineness of the metal particles, and the metal has for the most part been entirely lost to use.

An object of the present invention is to provide a simple and effective method for successfully recovering magnesium and magnesium-base alloys from dispersions thereof as discrete fine particles in spent fluxes and like mixtures essentially comprising alkali- and alkaline earth-metal halides.

The process of the invention depends for its success upon the discovery that although the fine globules of metal in spent flux cannot readily be coalesced to a single mass of metal, they can by agitation be caused to coalesce to comparatively coarse globules. These globules may be separated from the flux by a freezing operation and then subsequently remelted and coalesced to a single mass of metal.

According to the invention, recovery of dispersed metal from spent flux is accomplished by heating the flux to a temperature above the melting point of the mtal and agitating it for a time sufficient to effect coalescence of the metal to comparatively coarse globules, then cooling the flux to a temperature such as to freeze the metal without freezing the flux, and separating the resulting solid metal globules from the molten flux. The separated globules may then be remelted with agitation to form a coherent body of metal.

The spent flux to be treated is ordinarily derived from the "sludging" of pots used in the formation of magnesium-base alloys by the addition of alloying elements to molten magnesium, the melting of magnesium and magnesium-base alloy ingots prior to founding, or the recovery of magnesium and magnesium-base alloys from scrap. However, similar spent fluxes are sometimes also withdrawn from electrolytic cells for the production of metallic magnesium. Such spent fluxes ordinarily have a melting point substantially below that of the metal contained therein, and consist, in addition to the dispersed metal, of mixtures of alkali- and alkaline earth-metal halides, most commonly mixtures of magnesium chloride with sodium chloride or potassium chloride, together with an appreciable proportion of magnesium oxide and small quantities of impurities. The metal to be recovered is usually dispersed uniformly throughout the flux in the form of discrete fine globules, some of which may have a diameter as low as 0.01 inch. Such metal usually represents from 3 to 30 per cent by weight of the flux.

In practicing the invention, the spent flux, which is ordinarily received in solidified form, although it may be liquid if the recovery process of the invention is carried out at a point close to that where the sludge is produced, is charged to a suitable container and heated to a temperature above its melting point and above the melting point of the metal to be recovered, usually to at least 1150° F. The resultant molten mass is agitated for a time sufficient to permit coalescence of the fine globules of metal to comparatively coarse globules, usually about 0.5 inch or larger in diameter. Agitation is preferably carried out in such manner as to produce upward motion of the fine metal globules, either by means of a suitably designed mechanical stirrer, or more conveniently by injecting a continuous stream of air into the molten mass at a point well below the surface, and allowing the bubbles to escape upwards, creating the desired stirring motion. Stirring times of 0.2 to 2 hours are ordinarily required for the metal to coalesce to the desired particle size.

Coalescene of the fine globules to coarser globules may be accelerated by adding a small quantity of molten metallic magnesium to the flux during the treatment.

Following the coalescence step, the melt is cooled with stirring to a temperature such that the coarse metal globules freeze while the flux remains molten, usually to about 1000° F. The globules are then separated from the molten flux, either by skimming with a perforated ladle or by pouring the entire mass through a screen. The solid globules thus separated are then transferred to a separate container and heated with stirring in contact with a small proportion of fresh flux to cause them to coalesce to a single body of molten metal.

The following example will serve to illustrate the invention but is not to be construed as limiting its scope:

*Example*

The spent flux to be recovered was derived from "sludging" a melting pot used in the manufacture of a magnesium-base alloy by the addition of alloying elements to metallic magnesium. The spent flux had approximately the following composition in per cent by weight:

| | |
|---|---|
| Potassium chloride | 45 |
| Magnesium chloride | 20 |
| Magnesium oxide | 15 |
| Magnesium alloy | 20 | the magnesium-base alloy being dispersed throughout as fine globules having a diameter of roughly 0.06 inch. A 100 pound quantity of this spent flux was charged into a suitable melting pot and heated to a temperature of 1300° F. Air was then blown slowly into the melt at a point well below the surface thereof to effect agitation and thus cause coalescence of the fine metal globules to comparatively coarse globules having a diameter of roughly 1.0 inch, a period of 1.0 hour being required for the operation.

Following this treatment, the temperature of the melt was lowered to about 1000° F., whereupon the metal globules solidified but the flux remained molten. The resulting mixture was then poured through a 4 mesh screen to separate the metal. The individual globules thus recovered were then loaded into a separate pot and melted under flux, there being recovered 15 pounds of magnesium-base alloy in clean usable form.

Other modes of applying the principle of the invention may be employed instead of those explained, change being made as regards the details described, provided the step or steps recited in any of the following claims or equivalent thereof be employed.

We claim:

1. A method of recovering a magnesium-base alloy from a dispersion thereof in the form of discrete fine globules in a spent metallurgical flux essentially comprising alkali- and alkaline earth-metal halides which comprises: heating the spent flux at a temperature above the melting point of the flux and of the metal and agitating the same for a time sufficient to effect coalescence of the metal to comparatively coarse globules; thereafter cooling the flux to a temperature such as to freeze the metal without freezing the flux; separating the resulting solid metal globules from the molten flux; and remelting the separated globules under flux with agitation to form a coherent body of metal.

2. A method of recovering a magnesium-base alloy from a dispersion thereof in the form of discrete fine globules in a spent alkali- and alkaline earth-metal halide metallurgical flux essentially comprising magnesium chloride which comprises: heating the spent flux at a temperature above the melting point of the flux and of the metal and agitating the same in such manner as to effect an upward motion of the fine metal globules for a time sufficient to permit coalescence thereof to comparatively coarse globules; thereafter cooling the flux to a temperature such as to freeze the metal without freezing the flux; and separating the resulting solid metal globules from the molten flux.

3. A method according to claim 2 wherein the agitation of the flux mixture in the coalescence step is carried out by injecting air into the body of molten flux at a point well below the surface.

4. A method according to claim 2 wherein a small proportion of molten magnesium is added to the melt during the coalescence step.

5. In a method of recovering magnesium and magnesium-base alloys from dispersions thereof in the form of discrete fine globules in a molten flux essentially comprising alkali- and alkaline earth-metal halides wherein the flux is adjusted to a temperature such as to freeze the metal without freezing the flux, and the solid metal thus formed is separated from the molten flux, the improvement which comprises heating the flux mixture at a temperature above the melting point of the metal and agitating the same for a time sufficient to effect coalescence of the metal to comparatively coarse globules prior to the metal freezing and solid metal removal steps.

WILLIAM CLIFFORD NEWHAMS.
CHARLES E. NELSON.